US000001422H

United States Statutory Invention Registration [19]

[11] Reg. Number: H1422

[43] Published: Mar. 7, 1995

Walker, Jr. et al.

[54] HIGH VOLTAGE LITHIUM RECHARGEABLE ELECTROCHEMICAL CELL

[75] Inventors: Charles W. Walker, Jr.; Steven M. Slane, both of Neptune, N.J.

[73] Assignee: The United States of America as represented by the Secretary of the Army, Washington, D.C.

[21] Appl. No.: 703,319

[22] Filed: May 20, 1991

[51] Int. Cl.[6] ..... H01M 6/14

[52] U.S. Cl. ..... 429/194; 429/213

[58] Field of Search ..... 429/213, 194

[56] References Cited

U.S. PATENT DOCUMENTS 4,728,589 3/1988 MacDiarmid et al. ..... 429/213
4,987,042 1/1991 Jonas et al. ..... 429/213

OTHER PUBLICATIONS

Sumitomo, *Derwent Abstract* No. 89-064068, for Jap. 01-014871, Jan. 19, 1989.

*Primary Examiner*—Brooks H. Hunt
*Assistant Examiner*—Daniel J. Jenkins
*Attorney, Agent, or Firm*—Michael Zelenka; Roy E. Gordon

[57] ABSTRACT

A high voltage, rechargeable lithium electrochemical cell is provided that exhibits high cycling efficiency over many cycles. The cell comprises metallic lithium as the anode, poly 3-methylthiophene (PMT) polymer as the cathode, and $LiAsF_6$ salt dissolved in dimethylcarbonate (DMC) as the electrolyte.

4 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HIGH VOLTAGE LITHIUM RECHARGEABLE ELECTROCHEMICAL CELL

GOVERNMENT INTEREST

The invention described herein may be manufactured, used, and licensed by or for the Government for governmental purposes without the payment to us of any royalty thereon.

FIELD OF INVENTION

This invention relates in general to a high voltage lithium rechargeable electrochemical cell and in particular to such a cell with a thin conducting polymer cathode and electrolyte containing an alkyl-carbonate solvent.

BACKGROUND OF THE INVENTION

Rechargeable lithium batteries, especially those containing organic liquid based solvents, have generally suffered from poor cycling efficiencies of lithium, solvent oxidation (degradation) on charge, diminishing cathode capacity with increased cycling and hazardous situations resulting from cell abuse conditions as for example short circuit and overdischarge. Some solvents allow good lithium cycling efficiencies but are unstable to the high anode potentials required during charging. Similarly, electrolytes that are stable to oxidation often allow poor lithium cycling efficiency. Cell short circuiting that results from dendrite formations or from overdischarge may cause explosions. Overcharge may degrade the electrolyte or irreversibly diminish performance of certain cathodes.

SUMMARY OF THE INVENTION

The general object of this invention is to provide a high voltage lithium rechargeable electrochemical cell in which the aforementioned difficulties are overcome. A more particular object of the invention is to provide such a cell that is highly efficient on discharge and charge. A more particular object of the invention is to provide such a cell that is stable to oxidation of the electrolyte on charge and also stable to modest overcharge of the cathode. A still further object of the invention is to provide such a cell that allows much more cathode area to be packaged per unit volume than is possible for state-of-the-art porous carbon cathodes. Another object of the invention is to provide such a cell in which the safety hazards normally associated with lithium cells that are overdischarged or short circuited are diminished because the cathode becomes electrically insulating on discharge. A particular Object of the invention is to provide such a cell that is efficient during discharge and charge over hundreds of cycles.

It has now been found that a high voltage, rechargeable, lithium electrochemical cell can be provided that exhibits high cycling efficiency over many cycles, the cell including a metallic lithium anode, poly 3-methylthiophene (PMT) polymer cathode, and electrolyte including lithium hexafluoroarsenate $LiAsF_6$ salt dissolved in dimethyl carbonate (DMC).

Cell features include a high voltage cell employing a lithium anode which is able to be recharged. Also included is an electrically conductive polymer film as the cathode that is also rechargeable with excellent cycling efficiency. The electrolyte is composed of $LiAsF_6$ in DMC, providing an electrolyte that is neither oxidized nor reduced during cell operation. On discharge, no harmful products or adverse chemical reactions occur other than the release of $Li^+$ cations and $AsF_6^-$ anions into the electrolyte. There is a built-in safety feature to render extreme conditions such as short-circuit or overdischarge less hazardous; because the polymer becomes electrically more insulating during undoping (which occurs during cell discharge), as the polymer becomes less conductive and cell resistance increases, the polymer will act as an internal fuse to terminate cell operation. On charge, $Li^+$ is replated at the lithium anode and $AsF_6^-$ migrates to the oxidized (positively charged) PMT cathode to electrically neutralize its charge. Another attractive feature of the cell is the ability to overcharge the cathode over many cycles without deleterious effects. The cell reactions are:

DISCHARGE

Anode: $Li^o \rightarrow xLi^+ + x$ electrons

Cathode: $[PMT^+AsF_6^-]_x + x$ electrons $\rightarrow xPMT^o + xAsF_6^-$

CHARGE

Anode: $xLi^+ + x$ electrons $\rightarrow Li^o$

Cathode: $xPMT^o + xAsF_6^- \rightarrow [PMT^+AsF_6^-]_x + x$ electrons

Since no deleterious reactions occur, hundreds or thousands of cycles may be expected with negligible loss in discharge capacity or charge efficiency.

The metallic lithium anode is desired to create a high cell potential (>3 V) when coupled with the cathode. To minimize the quantity of lithium for increased safety, one can also use a lithium intercalating compound, such as graphite or one of the metal oxide compounds. Intercalating compounds would be useful to reduce the hazards associated with metallic lithium such as cell shorting resulting from such conditions as dendrite formation with cycling, abuse during discharge/charge and disposal.

The cathode is comprised of electrochemically formed, electrically conducting poly 3-methylthiophene polymer film. Depending on the level of doping, electrical conductivity of the polymer can be in the range of 10 to $2\times10^3$ S $cm^{-1}$. Because it is formed electrochemically, a very thin film can be produced on a suitable substrate which can then serve as the current collector in the cell. PMT films on the order of one micrometer thick can be formed, allowing more electrode area to be packaged per unit volume (compared to carbon electrodes common to lithium cells). Although there are many methods that one skilled in the art might use to prepare the polymer, a suitable procedure used for polymerizing PMT on a substrate is as follows:

Preparation of PMT is in a 125 ml European flask (Ace Glass) using a 1 $cm^2$ platinum flag counter electrode, a saturated sodium calomel reference electrode, and a platinum rod working electrode. The platinum rod is polished to a mirror finish with 0.1 micron alumina/water paste and sheathed in heat shrinkable Teflon so as to expose only the 0.071 $cm^2$ cross sectional area at the polished end of the rod. The cell is also fitted with a glass tube for bubbling gas and a gas outlet. The cell is flooded with electrolyte containing high purity 3-methylthiophene monomer and lithium hexafluoroarsenate at 0.1 molar concentrations in redistilled acetonitrile as the solvent. Ultra high purity dry argon is bubbled through the electrolyte to remove oxygen.

PMT polymerizes when the potential (working vs reference) is 1.5 V and above. An adherent film 1.4 microns thick is produced by pulse deposition. This is carried out at a constant current of 10 mA $cm^{-2}$ by passing 0.25 coulombs per $cm^2$ on five successive cycles with five minute rest periods (at open circuit) between cycles to restore equilibrium conditions. Films of poor quality formed if the rest periods were omitted. The PMT-coated platinum surface is then rinsed in acetonitrile and dried under vacuum at 50° C. In the oxidized ($AsF_6^-$-doped, electrically conductive) state PMT is blue in color, while reduced (undoped, electrically insulating) PMT is red. During cell cycling, the polymer becomes oxidized and reduced, being electrically neutralized by the insertion and loss of $AsF_6^-$ anions. Once the polymer becomes doped to its maximum level, an overcharge condition will exist where no more anions will be inserted, and additional charge will be wasted. If modestly overcharged, no harmful cell reactions will occur.

A conductive electrolyte that is stable during cell charging has been a concern in lithium systems because of the high oxidation potentials required. It is difficult to find solvents that are stable (will not become oxidized) during cell charging and will permit good lithium cycling efficiencies. One suitable solvent is dimethyl carbonate. DMC is stable to oxidation potentials up to 4.4 V. A stable, conductive electrolyte is formed with the addition of dry, high purity $LiAsF_6$ salt in redistilled DMC. In a 1.5M $LiAsF_6$-DMC electrolyte, conductivity is approximately 0.01 S $cm^{-1}$.

Constant current recharge of the system described herein is most efficient up to a cutoff potential of 3.8 V. Charging to a potential of 4.0 V provides additional capacity on discharge but exhibits a loss in efficiency on charge. These potentials are well within the limits of electrolyte stability.

DESCRIPTION OF THE PREFERRED EMBODIMENT

A cell is constructed with a lithium metal anode, a 1.4 micrometer thick poly 3-methylthiophene polymer cathode doped with $AsF_6^-$ and supported on a platinum substrate, and a lithium reference electrode. The cell is flooded with 10 ml of electrolyte composed of 1.46M $LiAsF_6$ in dimethyl carbonate.

The cell is discharged at 0.1 mA $cm^{-2}$ constant current until cell voltage falls to 2.7 V. After a one minute rest period at open circuit, the cell is charged at 0.05 mA $cm^{-2}$ constant current until cell potential reaches 3.8 V, allowing a one minute rest period prior to the next discharge. Under these conditions, cell discharge is reproducible over many cycles; likewise, cell recharge is reproducible over many cycles, replacing exactly the same number of coulombs as are removed on discharge.

DESCRIPTION OF THE DRAWING

FIG. 1 illustrates some of the cell discharges during the first 63 cycles. Cell capacity is extremely reproducible. Each recharge cycle replaces exactly 100% of the charge previously removed. Cell operating potential exceeds 3 V for nearly the entire discharge.

Figure 1:
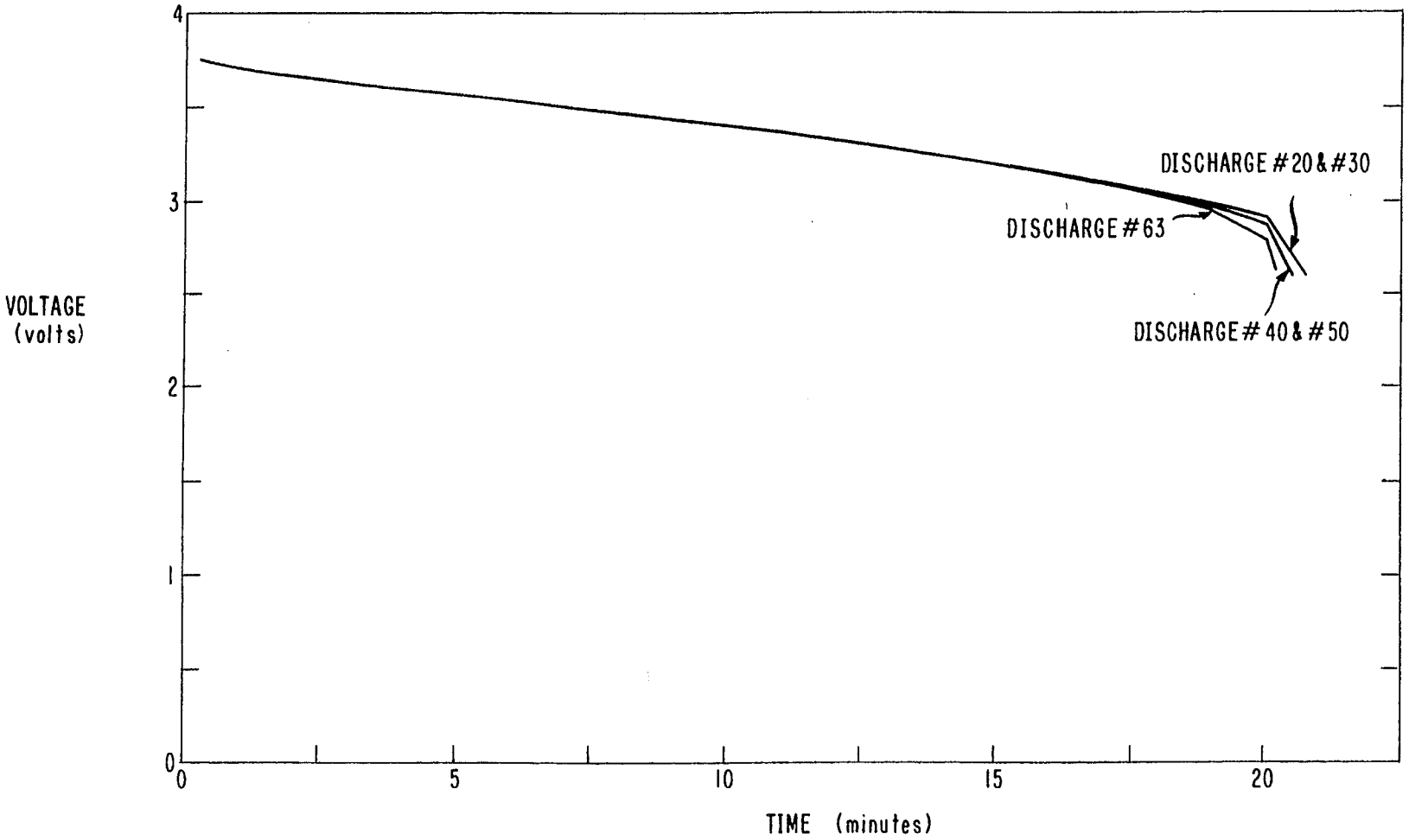
FIG. 1 shows a Li/1.46M $LiAsF_6$-DMC/1.4 μm thick PMT cell discharge at 0.1 mA $cm^{-2}$ constant current to a 2.7 V cutoff. Discharge curves are shown for discharge numbers 20, 30, 40, 50 and 63. Recharge is by constant current at 0.05 mA $cm^{-2}$ to a 3.8 V cutoff.
Figure 2:
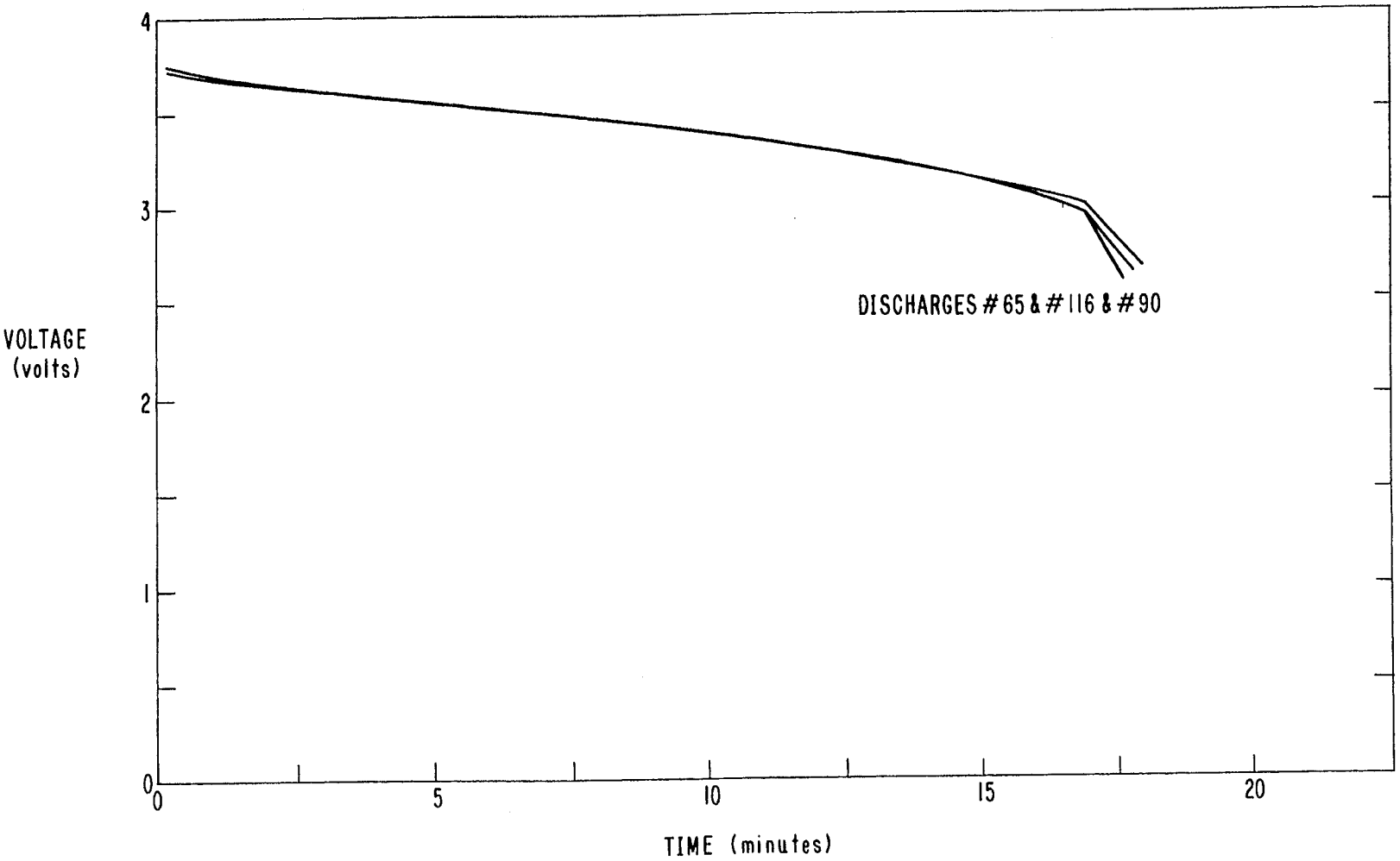
FIG. 2 shows a Li/1.46M $LiAsF_6$-DMC/1.4 μm thick PMT cell cycled after recharge at 0.05 mA $cm^{-2}$ to 3.8 V following short-circuiting of the cell and allowing it to sit for two days. Curves for 0.1 mA $cm^{-2}$ constant current discharge to a 2.7 V are shown for cycle numbers 63, 90 and 116.

After cycle 63, the cell is intentionally short-circuited and remains sitting for two days. The cell is again recharged (to the 3.8 V cutoff) and cycling continues. Approximately 12% of cell discharge capacity is irreversibly lost, but no further loss is observed over the next 53 cycles to cycle 116 (FIG. 2).

Figure 3:
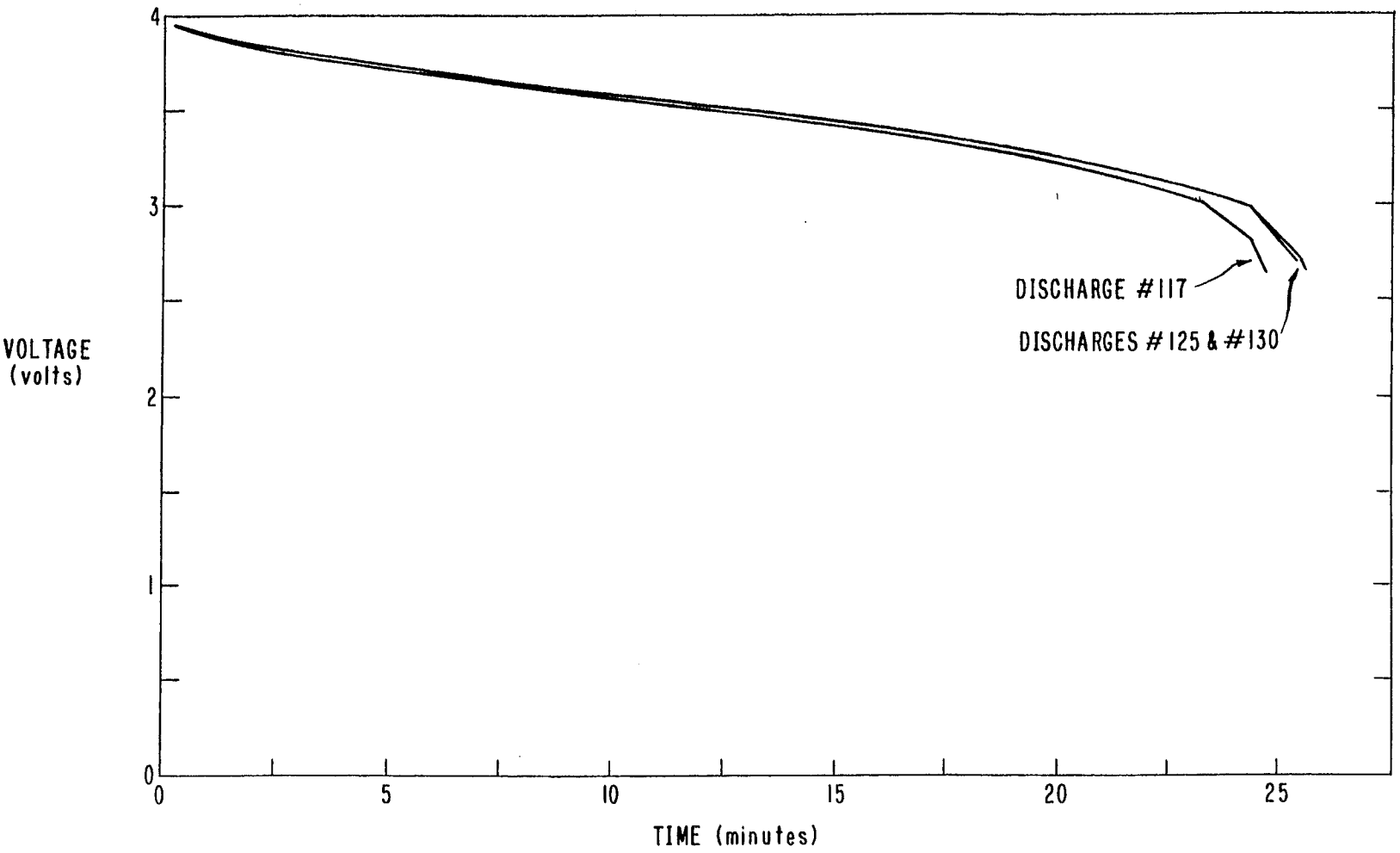
FIG. 3 shows a Li/1.46M $LiAsF_6$-DMC/1.4 μm thick PMT cell discharge at 0.1 mA $cm^{-2}$ constant current to a 2.7 V cutoff. Recharge is by constant current at 0.05 mA $cm^{-2}$ to a 4.0 V cut-off over fourteen cycles. Cycle numbers 117, 125 and 130 are shown.

The next 14 cycles (FIG. 3, cycles 117 through 130) as performed are with a recharge voltage cutoff of 4.0 V. Capacity increases over the first couple of cycles and then stabilizes for the remaining cycles. The increase in discharge capacity is presumed a result of doping the polymer to a higher level with $AsF_6^-$ anions. Recharge of the cell to 4.0 V results in an overcharge condition. Approximately 108% of the coulombs removed on discharge are passed during charging. After the initial increase in discharge capacity, overcharge remains at about 108%, and discharge capacity remains constant. This is important because it shows that in addition to the electrolyte being stable at a potential as high as 4.0 V, the polymer cathode is also stable to this potential. Further, the polymer cathode is stable to overcharge conditions, capable of continuing to provide a reproducible discharge.

There is some charging voltage cutoff, not yet determined, that better balances cell cycling; precluding current being wasted on cell overcharging while allowing maximum discharge capacity.

In the invention, in lieu of lithium as the anode, one might use lithium intercalating materials such as graphite, or any of several metal oxides or metal sulfides. The anode material might also be a metal such as calcium, sodium, magnesium, barium, potassium, titanium or strontium. The anode could also be comprised of alloys of lithium, sodium, aluminum, magnesium, calcium, barium, potassium, titanium or strontium. Then too, the anode might be metallic cation intercalating materials such as graphite or any of several metal oxides or metal sulfides.

As for the cathode, one might use poly 3-methylthiophene prepared by other methods to alter physical, chemical or electronic characteristics of the polymer. Also, one might prepare PMT on other substrates such as nickel or aluminum foil. One might also use other electrically conductive polymers with electrochemical characteristics similar to PMT.

As for the electrolyte, one might use a mixed solvent including DMC with methylformate, methylacetate, or some other solvent that provides higher electrolyte conductivity and lithium cycling efficiency. One might also use diethylcarbonate which is resistant to oxidation or diethylcarbonate mixed with methylfornate, methylactate or some other solvent. One might also use other stable salts and/or solvents, organic or inorganic. One might also use mixtures of these salts or solvents or mixtures of both salts and solvents.

The electrochemical cell of the invention can be use for high voltage electrical power in the form of a rechargeable battery. The cell can also be used as a power source where there is a-requirement for a high degree of safety and a large number of cycles. The cell might also find use as a high pulse power device when configured in a bipolar arrangement, since one is able to stack many cells in a small volume due to the very thin cathode. Then too, the cell might find use as a backup power in circuit board applications or as a reserve cell, especially in cases where it is desired to maintain constant trickle charge to ensure battery readiness.

We wish it to be understood that we do not desire to be limited to the exact details of construction shown and described for obvious modifications will occur to a person skilled in the art.

What is claimed is:

1. A high voltage, rechargeable lithium electrochemical cell that exhibits high cycling efficiency over many cycles, said cell comprising metallic lithium as the anode, poly 3-methylthiophene (PMT) polymer as the cathode, and $LiAsF_6$ salt dissolved in dimethyl carbonate (DMC) as the electrolyte.

2. An electrochemical cell according to claim 1 wherein the electrolyte is 1.46M $LiAsF_6$-DMC.

3. An electrochemical cell according to claim 1 wherein the cathode is 1.4 $\mu$m thick PMT.

4. An electrochemical cell according to claim 1 wherein the electrolyte is 1.46M $LiAsF_6$-DMC and wherein the cathode is 1.4 $\mu$m thick PMT.

* * * * *